United States Patent
Heo

(10) Patent No.: US 9,077,027 B2
(45) Date of Patent: Jul. 7, 2015

(54) ELECTRODE ASSEMBLY AND SECONDARY BATTERY USING THE SAME

(75) Inventor: Na-Ri Heo, Yongin-si (KR)

(73) Assignee: Samsung SDI Co., Ltd., Yongin-Gi (KR)

( * ) Notice: Subject to any disclaimer, the term of this patent is extended or adjusted under 35 U.S.C. 154(b) by 606 days.

(21) Appl. No.: 12/959,306

(22) Filed: Dec. 2, 2010

(65) Prior Publication Data

US 2011/0217591 A1    Sep. 8, 2011

Related U.S. Application Data

(60) Provisional application No. 61/310,603, filed on Mar. 4, 2010.

(51) Int. Cl.
*H01M 4/02* (2006.01)
*H01M 2/02* (2006.01)
(Continued)

(52) U.S. Cl.
CPC .............. *H01M 2/204* (2013.01); *H01M 2/266* (2013.01); *Y02E 60/12* (2013.01)

(58) Field of Classification Search
CPC ....... H01M 2/204; H01M 2/266; Y02E 60/12
USPC ......... 429/128, 136, 178, 179, 209, 210, 211, 429/153, 176
See application file for complete search history.

(56) References Cited

U.S. PATENT DOCUMENTS

| | | | |
|---|---|---|---|
| 7,410,723 B2 * | 8/2008 | Kim et al. | 429/175 |
| 2002/0157242 A1 * | 10/2002 | Fukuda et al. | 29/730 |

(Continued)

FOREIGN PATENT DOCUMENTS

| | | |
|---|---|---|
| CN | 1610166 A | 4/2005 |
| CN | 10188192 | 12/2005 |

(Continued)

OTHER PUBLICATIONS

Office Action dated Mar. 19, 2013 for corresponding JP Application No. 20110944947.

(Continued)

*Primary Examiner* — Carlos Barcena
(74) *Attorney, Agent, or Firm* — Knobbe Martens Olson & Bear LLP

(57) ABSTRACT

An electrode assembly according to an embodiment of the present invention comprises: at least one first electrode plate comprising a first electrode tab extending from the first electrode plate; at least one second electrode plate comprising a second electrode tab extending from the second electrode plate; at least one first intermediate electrode comprising a first intermediate electrode tab extending from the first intermediate electrode; at least one second intermediate electrode comprising a second intermediate electrode tab extending from the second intermediate electrode; and a separator disposed between the first electrode plate and the second electrode plate, and a separator disposed between the first intermediate electrode and the second intermediate electrode; wherein the first electrode plate is disposed at an outermost side in the electrode assembly with respect to the first intermediate electrode, and the second electrode plate is disposed at an outermost side in the electrode assembly with respect to the second intermediate electrode; and wherein the first electrode tab and the first intermediate electrode tab together constitute a first electrode lead, and the second electrode tab and the second intermediate electrode tab together constitute a second electrode lead.

16 Claims, 3 Drawing Sheets

(51) Int. Cl.
   *H01M 2/20*   (2006.01)
   *H01M 2/26*   (2006.01)

(56) References Cited

U.S. PATENT DOCUMENTS

| | | | |
|---|---|---|---|
| 2004/0033416 A1 | 2/2004 | Kim et al. | |
| 2004/0175605 A1 | 9/2004 | Eshraghi et al. | |
| 2005/0084749 A1 | 4/2005 | Hwang et al. | |
| 2005/0271943 A1* | 12/2005 | Park et al. | 429/231.1 |
| 2007/0166611 A1* | 7/2007 | Oh et al. | 429/160 |
| 2008/0008910 A1* | 1/2008 | Koh | 429/7 |
| 2008/0070115 A1 | 3/2008 | Saruwatari et al. | |
| 2008/0292952 A1* | 11/2008 | Yanagihara et al. | 429/162 |
| 2009/0176155 A1 | 7/2009 | Choi | |
| 2009/0197162 A1* | 8/2009 | Shinyashiki et al. | 429/161 |

FOREIGN PATENT DOCUMENTS

| | | |
|---|---|---|
| CN | 101088192 | 12/2005 |
| JP | 2001-325945 A | 11/2001 |
| JP | 2002-075324 A | 3/2002 |
| JP | 2003-086170 A | 3/2003 |
| JP | 2004-241328 A | 8/2004 |
| JP | 2005-174691 A | 6/2005 |
| JP | 2006-520087 A | 8/2006 |
| JP | 2006-278331 A | 10/2006 |
| JP | 2006-324093 A | 11/2006 |
| JP | 2007-142325 A | 6/2007 |
| JP | 2009-187768 A | 2/2008 |
| JP | 2008-251541 A | 10/2008 |
| JP | 2009-026739 A | 2/2009 |
| KR | 10-2003-0023820 | 3/2003 |
| KR | 2007-0009231 A | 1/2007 |
| KR | 10-2008-0007697 | 1/2008 |
| WO | WO 2006/068431 A1 | 6/2006 |

OTHER PUBLICATIONS

Office Action dated Mar. 29, 2013 for corresponding KR Application No. 10-2011-0017116.
Office Action dated Jun. 26, 2013 for corresponding EP Application No. 11156516.4.
Office Action dated Jul. 9, 2013 for corresponding JP Application No. 2011-044947.
Office Action issued on Feb. 14, 2014 for Chinese Patent Application No. 201110047484.1.
Notice of Allowance issued on Feb. 28, 2014 for Korean Patent Application No. 10-2011-0017116.
Office Action dated May 30, 2013 for corresponding CN Application No. 201110047484.1.

* cited by examiner

ELECTRODE ASSEMBLY AND SECONDARY BATTERY USING THE SAME

RELATED APPLICATIONS

This application claims the benefit of U.S. Provisional Application No. 61/310,603, filed on Mar. 4, 2010, the disclosure of which is incorporated herein by reference in its entirety.

BACKGROUND

1. Field

An embodiment of the present invention relates to an electrode assembly and a secondary battery using the same, and more particularly, to an electrode assembly and a secondary battery using the same that are capable of simplifying a process and saving cost by modifying the form of an electrode tab of an outermost substrate among electrode plates.

2. Description of the Related Technology

As portable electronic apparatuses are being miniaturized and lightened, research has been conducted into secondary batteries in their use as driving power sources. As the decreasing weight and functionality of portable wireless device products, including cellular phones, notebook computers, personal digital assistants (PDAs), etc. progress, the importance of the secondary battery in its use as a driving power source for such products is remarkably emphasized.

Since the secondary battery can be repeatedly used through the repetition of charging and discharging, the secondary battery is more economical than a primary battery. Moreover, since the miniaturization and the high capacity of the secondary battery can be utilized, and the secondary battery has high operating voltage and high energy density per weight, the secondary battery is being widely used in high-tech electronic devices.

In particular, the lithium secondary battery, which typically has an operating voltage of 3.7V, is three times higher than the nickel-cadmium battery or the nickel-hydride battery which are primarily used as power sources for portable electronic equipments.

In general, the demand for certain secondary batteries, such as a can-type battery or a pouch-type battery having a small thickness that can be used with a cellular phone is high with respect to shape, and the demand for a secondary battery such as a lithium polymer battery having excellent energy density, discharge voltage, and safety is high with respect to material.

In the can-type or pouch-type battery, an electrode assembly, electrode tabs extending from the electrode assembly, and electrode leads welded to the electrode tabs are typically accommodated in a can or a pouch. The electrode assembly also typically has a structure in which an anode plate, a cathode plate, and a separator that is interposed therebetween and insulates them from each other are sequentially laminated or wound.

In addition, the electrode tabs typically are individually extended and fused from the anode plate and the cathode plate of the electrode assembly, and the electrode tabs typically are electrically connected with each of anode and cathode electrode leads and a part of each electrode tab is typically exposed outside the can or pouch. The exposed electrode lead is typically electrically connected with a protection circuit module in a subsequent process.

However, as such, the electrode tabs extending from each of the anode plate and the cathode plate of the electrode assembly are fused and thereafter, when each of the electrode tabs is connected with the electrode lead, the manufacturing process can become complicated and the electrode tab and the electrode lead may become separated from each other while the subsequent process is performed.

SUMMARY

According to an embodiment of the present invention, an electrode assembly comprises: at least one first electrode plate comprising a first electrode tab extending from the first electrode plate; at least one second electrode plate comprising a second electrode tab extending from the second electrode plate; at least one first intermediate electrode comprising a first intermediate electrode tab extending from the first intermediate electrode; at least one second intermediate electrode comprising a second intermediate electrode tab extending from the second intermediate electrode; and a separator disposed between the first electrode plate and the second electrode plate, and a separator disposed between the first intermediate electrode and the second intermediate electrode; wherein the first electrode plate is disposed at an outermost side in the electrode assembly with respect to the first intermediate electrode, and the second electrode plate is disposed at an outermost side in the electrode assembly with respect to the second intermediate electrode; and wherein the first electrode tab and the first intermediate electrode tab together constitute a first electrode lead, and the second electrode tab and the second intermediate electrode tab together constitute a second electrode lead.

According to an embodiment, the first electrode tab covers the first intermediate electrode tab, and the second electrode tab covers the second intermediate electrode tab.

According to an embodiment, the first electrode plate and the first electrode tab are thicker than the first intermediate electrode and the first intermediate electrode tab, respectively, and the second electrode plate and the second electrode tab are thicker than the second intermediate electrode and the second intermediate electrode tab, respectively.

According to an embodiment, the at least one first electrode plate and the at least one first electrode tab and the at least one second electrode plate and the at least one second electrode tab has a thickness in the range of 50 to 100 μm.

According to an embodiment, the first electrode tab and the second electrode tab each has a width in the range of 5 to 40 mm.

According to an embodiment, the at least one first electrode tab and the at least one second electrode tab each has a length that is 150% to 200% of the length of the at least one first intermediate electrode tab and the at least one second intermediate electrode tab.

According to an embodiment, the pair of first electrode tabs and the at least one intermediate electrode tab is coupled to each other by welding, and the pair of second electrode tabs and the at least one second intermediate electrode tab is coupled to each other by welding.

According to an embodiment, an insulating tape is coupled to portions of the first electrode tab and the second electrode tab.

According to an embodiment, a secondary battery may be manufactured comprising the above-mentioned electrode assembly.

BRIEF DESCRIPTION OF THE DRAWINGS

The accompanying drawings, with the specification, illustrate certain embodiments of the present invention, and serve to explain the principles of embodiments of the present invention.

DETAILED DESCRIPTION OF THE EMBODIMENTS

Figure 1:
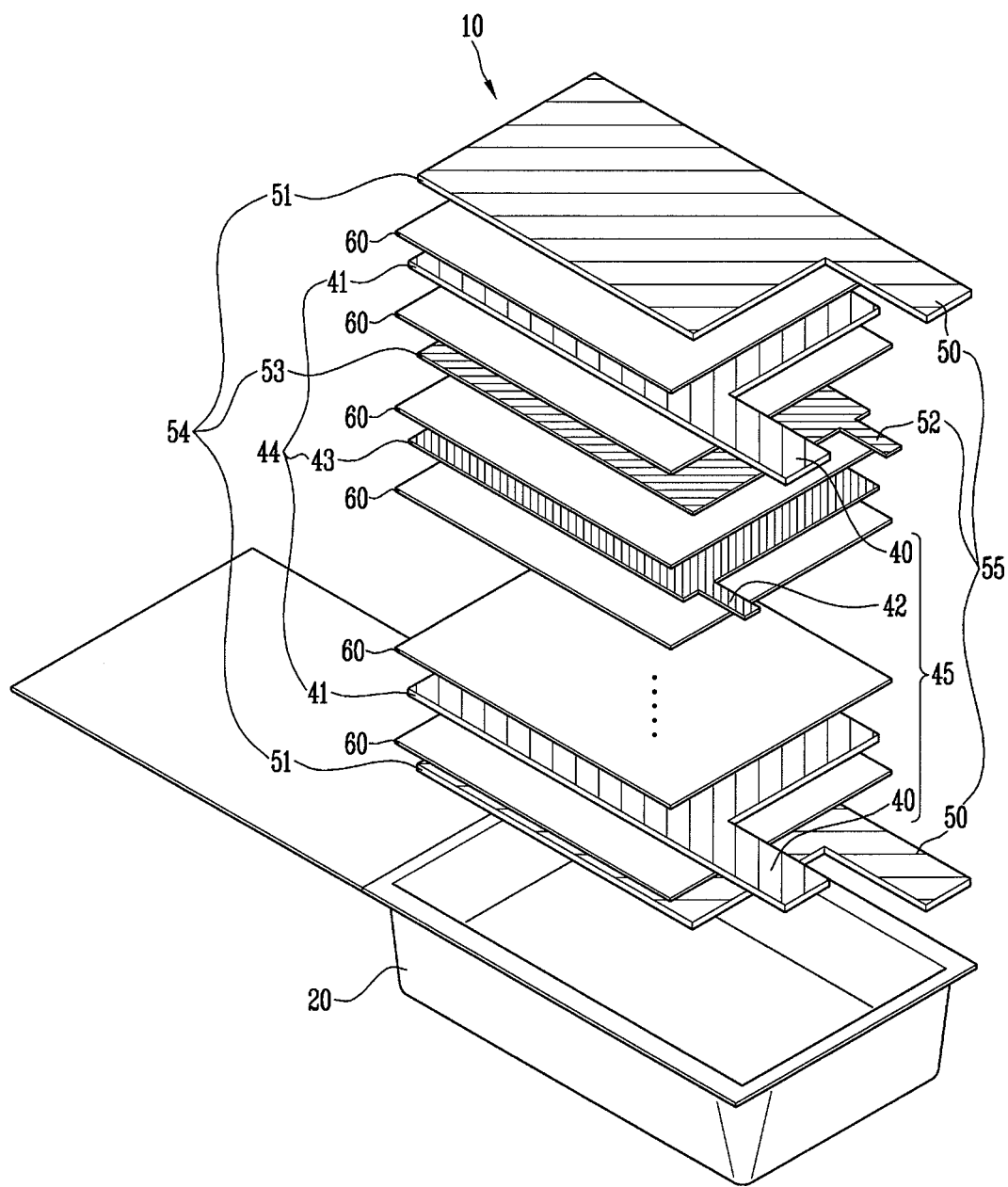
FIG. 1 is a perspective view showing a state in which an electrode assembly in a pouch case is disassembled according to an embodiment of the present invention.

In the following detailed description, only certain embodiments of the present invention have been shown and described, by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or indirectly on the another element with one or more intervening elements interposed therebetween. Also, when an element is referred to as being "connected to" another element, it can be directly connected to another element or indirectly connected to another element with one or more intervening elements interposed therebetween. Hereinafter, like reference numerals refer to like elements.

An electrode assembly and a secondary battery using the same according to an embodiment of the present invention will now be described in detail with reference to the accompanying drawings illustrating embodiments of the present invention.

FIG. 1 is a perspective view showing a state in which an electrode assembly in a pouch case is disassembled according to an embodiment of the present invention.

Referring to FIG. 1, an electrode assembly 10 includes an anode plate 54 and a cathode plate 44 to which an active material is applied and a separator 60 interposed therebetween is laminated. Anode tabs 55 that extend from one side may be formed on the anode plate 54 and cathode tabs 45 that extend from the other side in the same direction as the anode tabs 55 may be formed on the cathode plate 44. The anode plate 54 and the cathode plate 44 may include a pair of outermost anode plates 51 and a pair of outermost cathode plates 41 positioned at the outermost portion, and a plurality of intermediate anode plates 53 and a plurality of intermediate cathode plates 43 interposed therebetween.

In the embodiment illustrated in FIG. 1, the outermost anode plate 51 is an anode plate 51 positioned at the outermost portion among the laminated anode plates 54 and the outermost cathode plate 41 is a cathode plate 41 positioned at the outermost portion among the laminated cathode plates 44. At this time, any one pair of outermost anode plates 51 or pair of outermost cathode plate 41 may actually be the outermost portion of the electrode assembly 10, but in the present embodiment, a pair of outermost anode plates 51 is formed at the outermost portion of the electrode assembly 10.

The outermost anode plate 51 may be thicker than the intermediate anode plate 53, and the outermost anode tab 50 may be larger than the intermediate anode tab 52. By this configuration, the outermost anode tab 50 can tie the intermediate anode tabs 52 of the intermediate anode plates 53 and in addition, the outermost anode tab 50 itself can serve as the electrode lead without additionally attaching an electrode lead electrically connected with a protection circuit module (not shown) at the time of forming a core pack.

In general, the thickness of the intermediate anode plate 53 may be in the range of 12 to 30 μm and in the embodiment of the present invention, the thickness of the outermost anode plate 51 covering the intermediate anode plate 53 may be in the range of 50 to 100 μm. That is, when the outermost anode tab 50 attached to the outermost anode plate 51 has a thickness less than 50 μm, the outermost anode tab 50 can have the thickness equal to or smaller than the intermediate anode tabs 52, such that the strength of the outermost substrate can deteriorate. In addition, when the outermost anode tab 50 has a thickness more than 100 μm, the outermost substrate can become excessively thicker, such that inter-attachment is not easy and in addition, the secondary battery becomes thicker.

Further, the outermost cathode tab 40 may also like the outermost anode tab 50 be thicker than the intermediate cathode tabs 42. In general, the thickness of the intermediate cathode plate 43 may be in the range of 8 to 20 μm and the thickness of the outermost cathode plate 41 covering the intermediate cathode plate 43 may be in the range of 50 to 100 μm. Herein, the outermost cathode tab 40 and the intermediate cathode tabs 42 may extend in the same direction as the outermost anode tab 50 and the intermediate anode tabs 52, but to the other side so as to not overlap with the outermost anode tab 50 and the intermediate anode tabs 52 that extend to one side.

The anode plate 54 and the cathode plate 44 are generally formed by applying and filling the active material to and into a metallic substrate, and drying, roll-pressing, and cutting, but may be differently formed depending on the type of secondary battery. The anode plate 54 and the cathode plate 44 may be fabricated by coating an aluminum metal foil and a copper metal foil with slurries and subsequent drying. The slurries may include the active materials of the anode plate 54 and the cathode plate 44, and a fixing agent that allows the active materials to adhere to the metal foils. For a lithium secondary battery, an oxide containing lithium may be primarily used as an anode active material and any one of hard carbon, soft carbon, graphite, and a carbon substance may primarily be used as a cathode active material, but the present invention is not limited to the lithium secondary battery.

The separator 60 may be interposed between the anode plate 54 and the cathode plate 44. An insulating thin film having high ion permeability and high mechanical strength may be used. Diameters of pores of the separator 60 may generally be in the range of 0.01 to 10 μm and thicknesses thereof may generally be in the range of 5 to 300 μm. A sheet or a non-woven fabric made of an olefinic polymer, such as chemical-resistant and hydrophobic polypropylene, a glass fiber, or polyethylene, may be used as the separator 60, for example. According to embodiments, a solid electrolyte, such as polymers, etc., may also serve as the separator 60.

In addition, a pouch case 20 may have a receiving space that can house the electrode assembly 10. The pouch case 20 may generally be formed on the top and on the bottom of an aluminum thin film to form a laminate structure. An inner surface of the pouch case 20 may be made of a heat adhesive resin.

Figure 2:
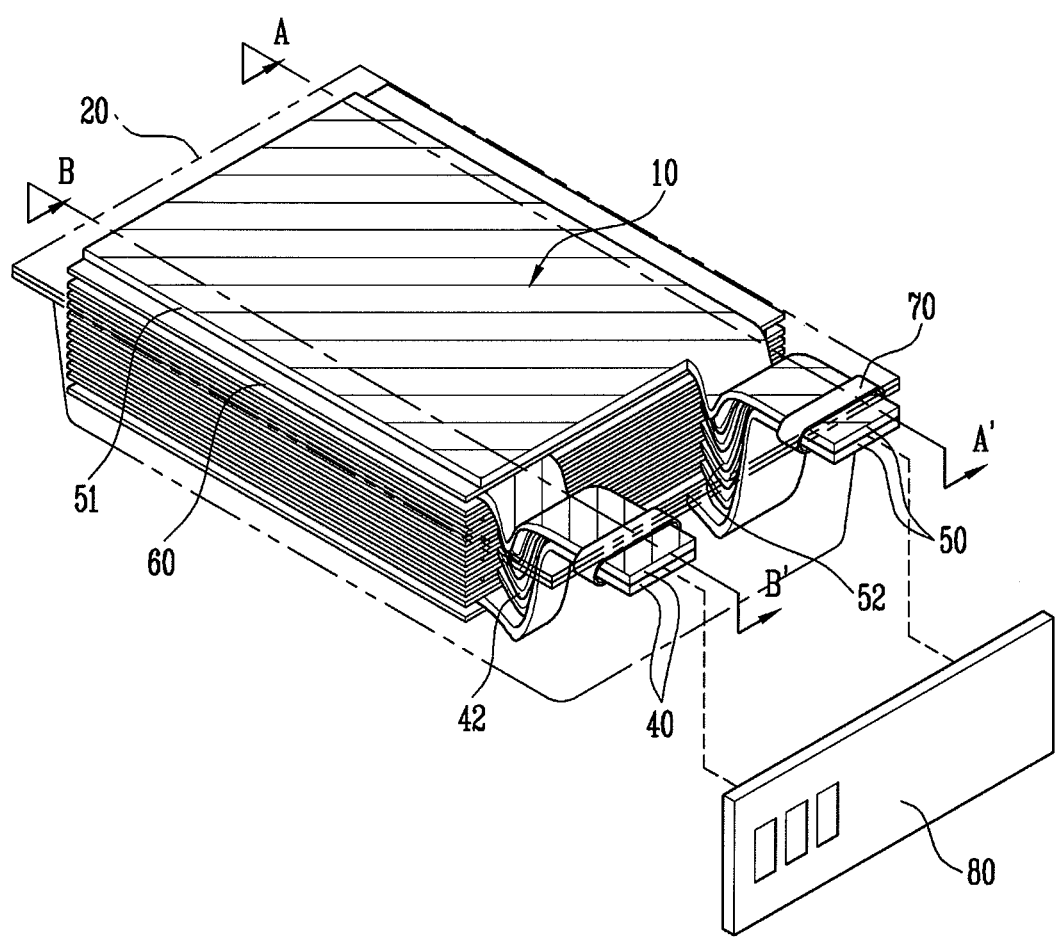
FIG. 2 is a perspective view of a secondary battery according to an embodiment of the present invention.

FIG. 2 is a perspective view of a secondary battery according to an embodiment of the present invention.

Referring to FIG. 2, when the electrode assembly 10 is received in the receiving space of the pouch case 20, a pair of outermost anode tabs 50 and a pair of outermost cathode tabs 40 may be partially exposed outside the pouch case 20. An insulating tape 70 that insures electrical insulation while increasing the airtight seal within the pouch case 20 may be attached to the outermost electrode tabs 40 and 50 that are in contact with the pouch case 20.

As described above, the pouch case 20 may be generally fanned on the top and on the bottom of the aluminum thin film to form a laminate structure covered with nylon, or a synthetic resin such as polypropylene or polyethylene, etc. The inner surface of the pouch case 20 may be made of the heat adhesive resin to provide an airtight seal. As a result, the heat adhesive resin coated on the inner surface of the pouch case 20 may be inter-fused by heating and pressing to make the pouch case 20 airtight.

Since a pair of outermost anode tabs 50 and a pair of outermost cathode tabs 40 may be partially exposed outside the pouch case 20 while tying the intermediate anode tabs 52 and the intermediate cathode tabs 42 positioned therein to serve as the electrode lead, they would have a size that is large enough to cover the intermediate anode tabs 52 and the intermediate cathode tabs 42.

Preferably, the widths of the outermost anode tab 50 and the outermost cathode tab 40 are in the range of 5 to 40 mm. Since the widths of the intermediate anode tab 52 and cathode tabs 42 are in the range of 4 to 7 mm according to embodiments, the widths of the outermost anode tab 50 and the outermost cathode tab 40 are preferably in the range of 5 to 40 mm to be large enough to cover the intermediate anode and cathode tabs. Further, the lengths of the outermost anode tab 50 and the outermost cathode tab 40 should be 150% to 200% of the lengths of the intermediate anode tab 52 and the intermediate cathode tab 42, respectively.

When the lengths of the outermost anode tab 50 and the outermost cathode tab 40 are formed to be less than 150% to 200% of the lengths of the intermediate anode tab 52 and the intermediate cathode tab 42, respectively, they may not be large enough to sufficiently cover the intermediate anode tab 52 and the intermediate cathode tab 42. In addition, when the lengths of the outermost anode tab 50 and the outermost cathode tab 40 are more than 200% of the lengths of the intermediate anode tab 52 and the intermediate cathode tab 42, respectively, unnecessary portions of the outermost anode tab 50 and cathode tab 40 positioned inside or outside the pouch case may occupy additional space.

According to an embodiment, a pair of outermost anode tabs 50 and a pair of outermost cathode tabs 40 may be attached by laser welding. By this configuration, since the outermost anode tab 50 and the outermost cathode tab 40 can cover the intermediate anode tabs 52 and the intermediate cathode tabs 42 interposed therebetween and be partially exposed outside the pouch case 20, the outermost anode tab 50 and the outermost cathode tab 40 may serve as the electrode lead.

Figure 3:
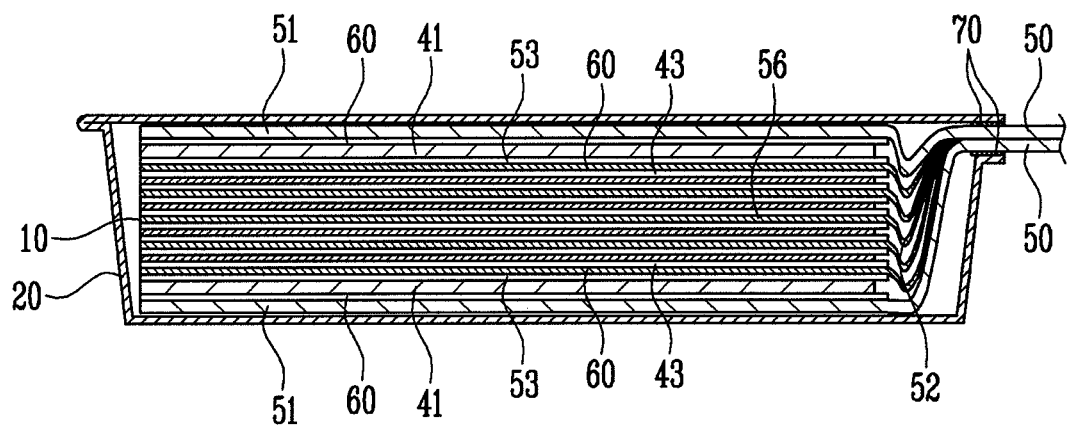
FIG. 3 is a cross-sectional view taken along line A-A' of FIG. 2.

FIG. 3 is a cross-sectional view taken along line A-A' of FIG. 2.

Referring to FIG. 3, in the electrode assembly 10 positioned in the pouch case 20, the anode plate 54, the separator 60, and the cathode plate 44 may be sequentially laminated. The cathode plate 44 may be slightly larger than the anode plate 54 and the separator 60 may be slightly larger than the cathode plate 44 and interposed between the anode plate 54 and the cathode plate 44. That is, the anode plate 54, the cathode plate 44, and the separator 60 may be formed according to size. In general, the separator 60 of the laminate-type electrode assembly 10 may be fabricated larger than the anode plate 54 and the cathode plate 44 in order to prevent a short-circuit that may be caused by contact between the anode plate 54 and the cathode plate 44. Further, the anode plate 54 may be fabricated to be slightly smaller than the cathode plate 44 in consideration of a lithium ion precipitation phenomenon that is intermittently generated in the cathode plate 44 at the time of charging.

The lamination form of the electrode assembly 10 will now be described in more detail. The anode plate 56 may be positioned at the center of the electrode assembly 10. The anode plates 51 may be positioned evenly at both outermost portions of the electrode assembly 10 and may be vertically symmetric to each other with respect to the central anode plate 56. That is, the electrode assembly 10 may have a structure in which the separator 60 is laminated at both sides of the central anode plate 56, the intermediate cathode plates 43 are laminated at both sides of the separator 60, and the intermediate anode plates 53 are positioned at both sides of the intermediate cathode plate 43, and such a configuration is repeated.

In addition, an active material (not shown) may be applied to the anode plate 56 positioned at the center of the electrode assembly 10, and both surfaces of the internal intermediate anode plates 53 and the internal intermediate cathode plates 43 and the active material may be applied to only the inner surface of the outermost anode plate 51.

In the electrode assembly 10 having the above-mentioned lamination structure, a pair of outermost anode plate 51 can be thicker than the intermediate anode electrodes 53, and the outermost anode tab 50 can have a larger width and a larger length. Therefore, the outermost plate may serves as the electrode lead while covering and tying the intermediate anode tabs 52.

According to an embodiment, the insulating tape 70 is attached to a portion where the outermost anode tab 50 is exposed outside and in contact with an airtight pouch case 20. That is, when the pouch case 20 is airtight, the insulating tape 70 that insulates the pouch case 20 and the outermost anode tab 50 from each other may be included. When the heat adhesive resin is fused onto the inner surface of the pouch case 20, the insulating tape 70 can prevent a short-circuit of the outermost electrode tabs 40 and 50 and the aluminum thin film. Meanwhile, the insulating tape 70 should not hinder the airtight state of the pouch case 20 and should not serve as a route for permeation of moisture or outflow of electrolytes.

Figure 4:
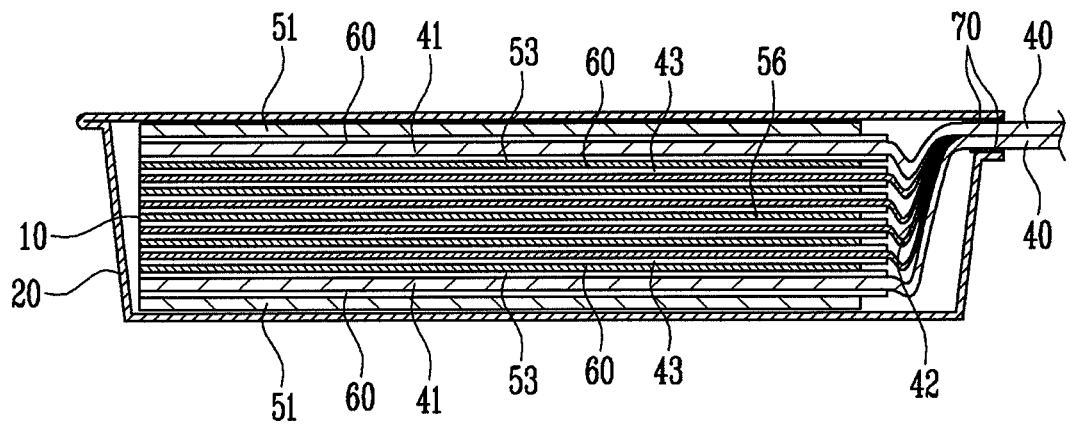
FIG. 4 is a cross-sectional schematic view taken along line B-B' of FIG. 2.

FIG. 4 is a cross-sectional schematic view taken along line B-B' of FIG. 2.

Referring to FIG. 4, in the same structure as FIG. 3, the intermediate cathode tabs 42 are covered by a pair of outermost cathode tabs 40. Herein, the outermost cathode plate 41 is positioned in the outermost anode plate 51 with the separator 60 interposed therebetween. The intermediate cathode tabs 42 and the outermost cathode tab 40 may be formed at a location where they are not overlapped with an area where the intermediate anode tabs 52 and the outermost anode tab 50 are positioned.

While the insulating tape 70 is attached to a portion of a pair of outermost cathode tab 40 that are in contact with the pouch case 20, a pair of outermost cathode tabs 40 can cover the intermediate cathode tabs 42 positioned therein. By this configuration, as processes of manufacturing the electrode assembly 10 are made simpler, productivity may be improved so that it becomes possible to save costs associated with providing for an additional electrode lead substrate.

In the above-mentioned embodiment, the anode plate is positioned at the center and at both outermost sides of the electrode assembly, but the cathode plate is positioned at the center and at both outermost sides of the electrode assembly.

Further, in the above-mentioned embodiment, although the pouch-type secondary battery has been described, embodiments of the present invention are not limited thereto. In addition, of course, the present invention can be applied to jelly-roll, cylindrical, and zigzag types of electrode assemblies having structures in which a long sheet-type of anode plate and a long sheet-type of cathode plate are wound with a separator interposed therebetween.

As described above, according to an embodiment of the present invention, a process of attaching an additional electrode lead can be omitted by increasing the thickness of an outermost substrate among electrode plates and the size of an electrode tab to tie electrode tabs of internal substrates and use them as an electrode lead. Therefore, as the process is made simpler, productivity can be improved to make it possible to save costs associated with providing for an additional electrode lead substrate.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising an electrode assembly comprising:
    at least one first electrode plate comprising a first electrode tab extending from the first electrode plate;
    at least one second electrode plate comprising a second electrode tab extending from the second electrode plate;
    at least one first intermediate electrode comprising a first intermediate electrode tab extending from the first intermediate electrode;
    at least one second intermediate electrode comprising a second intermediate electrode tab extending from the second intermediate electrode; and
    a separator disposed between the first electrode plate and the second electrode plate, and a separator disposed between the first intermediate electrode and the second intermediate electrode;
    wherein the first electrode plate is disposed at an outermost side in the electrode assembly with respect to the first intermediate electrode and the first electrode tab has greater dimensions in the length of the first intermediate electrode tab and covers the first intermediate electrode tab, and the second electrode plate is disposed at an outermost side in the electrode assembly with respect to the second intermediate electrode and the second electrode tab has greater dimensions in the length of the second intermediate electrode tab and cover the second intermediate electrode tab;
    wherein the first electrode tab and the first intermediate electrode tab together constitute a first electrode lead, and the second electrode tab and the second intermediate electrode tab together constitute a second electrode lead;
    wherein the first and second electrode leads are directly coupled to the protective circuit module.

2. The secondary battery assembly of claim 1, wherein the first electrode plate and the first electrode tab are thicker than the first intermediate electrode and the first intermediate electrode tab, respectively, and wherein the second electrode plate and the second electrode tab are thicker than the second intermediate electrode and the second intermediate electrode tab, respectively.

3. The secondary battery assembly of claim 1, wherein the at least one first electrode plate comprises a pair of first electrode plates comprising a pair of first electrode tabs extending from each first electrode plate;
    the at least one second electrode plate comprises a pair of second electrode plates comprising a pair of second electrode tabs extending from each second electrode plate;
    the pair of first electrode plates is disposed on outermost sides in the electrode assembly with respect to the first intermediate electrode, and the pair of second electrode plates is disposed on outermost sides in the electrode assembly with respect to the second intermediate electrode; and
    the pair of first electrode tabs and the at least one first intermediate electrode tab together constitute a first electrode lead, and the pair of second electrode tabs and the at least one second intermediate electrode tab together constitute a first electrode lead.

4. The secondary battery assembly of claim 3, wherein the at least one first intermediate electrode tab is coupled to and covered by the pair of first electrode tabs, and the at least one second intermediate electrode tab is coupled to and covered by the pair of second electrode tabs.

5. The secondary battery assembly of claim 3, wherein the pair of first electrode tabs and the at least one first intermediate electrode tab is coupled to each other by welding, and the pair of second electrode tabs and the at least one second intermediate electrode tab is coupled to each other by welding.

6. The secondary battery assembly of claim 3, wherein the at least first intermediate electrode comprises a central electrode, wherein first and second separators are disposed on both sides of the central electrode, wherein a pair of second intermediate electrodes are disposed on outermost sides of the first and second separators, wherein third and fourth separators are disposed on outermost sides of the pair of second intermediate electrodes, and wherein a pair of first intermediate electrodes are disposed on outermost sides of the third and fourth separators.

7. The secondary battery assembly of claim 1, wherein the at least one first electrode tab and the at least one second electrode tab each has a length that is 150% to 200% of the length of the at least one first intermediate electrode tab and the at least one second intermediate electrode tab, respectively.

8. The secondary battery assembly of claim 1, wherein the at least one first electrode plate and the at least one first electrode tab and the at least one second electrode plate and the at least one second electrode tab each has a thickness in the range of 50 to 100 μm.

9. The secondary battery assembly of claim 1, wherein the first electrode tab and the second electrode tab each has a width in the range of 5 to 40 mm.

10. The secondary battery assembly of claim 1, further comprising an insulating tape coupled to portions of the first electrode tab and to the second electrode tab.

11. The secondary battery assembly of claim 1, wherein the outermost electrode plates in the electrode assembly are anode electrode plates.

12. The secondary battery assembly of claim 1, wherein the first electrode plate is an anode electrode plate and the second electrode plate is a cathode electrode plate.

13. The secondary battery assembly of claim 1, wherein the electrode assembly is further inserted into a pouch case.

14. The secondary battery assembly of claim 13, wherein the pouch case further comprises an adhesive resin along an inner surface to form an airtight pouch case.

15. The secondary battery assembly of claim 13, wherein a portion of the first electrode tab and a portion of the second electrode tab are exposed to an exterior of the pouch case to provide first and second electrode leads to a protective circuit module.

16. The secondary battery assembly of claim 1, wherein the first and second electrode tabs are directly connected to the protective circuit module.

* * * * *